United States Patent
Goel et al.

(10) Patent No.: US 12,074,844 B2
(45) Date of Patent: Aug. 27, 2024

(54) SECURE AND DYNAMIC ASSIGNMENT OF NETWORK ADDRESSES TO NETWORK DEVICES IN AN INFORMATION PROCESSING SYSTEM

(71) Applicant: Dell Products L.P., Round Rock, TX (US)

(72) Inventors: Naman Goel, Bangalore (IN); Ravishankar Kanakapura Nanjundaswamy, Bangalore (IN); Ravikanth Chaganti, Bangalore (IN)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 18/094,442

(22) Filed: Jan. 9, 2023

(65) Prior Publication Data
US 2024/0236036 A1 Jul. 11, 2024

(51) Int. Cl.
*H04L 61/5014* (2022.01)
*H04L 41/0853* (2022.01)
*H04L 61/5061* (2022.01)

(52) U.S. Cl.
CPC ...... *H04L 61/5014* (2022.05); *H04L 41/0853* (2013.01); *H04L 61/5061* (2022.05)

(58) Field of Classification Search
None
See application file for complete search history.

(56) References Cited

U.S. PATENT DOCUMENTS

| | | | | |
|---|---|---|---|---|
| 6,647,009 | B1* | 11/2003 | Kubota | H04L 12/1836 370/395.54 |
| 2006/0075103 | A1* | 4/2006 | Cromer | G06Q 10/10 709/225 |
| 2018/0159942 | A1* | 6/2018 | Chen | H04L 67/51 |
| 2021/0328874 | A1* | 10/2021 | Jacobson | G06F 9/4401 |

(Continued)

OTHER PUBLICATIONS

Cisco Systems Inc., "Configuring DHCP Snooping," Cisco Nexus 7000 Series NX-OS Security Configuration Guide, Release 4.1, Chapter 15, https://www.cisco.com/c/en/us/td/docs/switches/datacenter/sw/4_1/nx-os/security/configuration/guide/sec_nx-os-cfg/sec_dhcpsnoop.html, Accessed Oct. 5, 2022, 20 pages.

(Continued)

*Primary Examiner* — Mohamed Ibrahim
(74) *Attorney, Agent, or Firm* — Ryan, Mason & Lewis, LLP (57) ABSTRACT

An apparatus in an illustrative embodiment comprises at least one processing device including a processor and a memory. The at least one processing device is configured to implement a management controller for a network device, the management controller being configured to communicate with at least one management server external to the network device. The at least one processing device is further configured to obtain network configuration information for one or more network interfaces of the network device, to deploy a network address server at least in part on the management controller, and to utilize the network address server deployed at least in part on the management controller to assign at least one network address to each of one or more of the network interfaces of the network device.

17 Claims, 7 Drawing Sheets

(56) References Cited

U.S. PATENT DOCUMENTS

2021/0336772 A1* 10/2021 Debata .................. H04L 9/0894
2023/0116820 A1*  4/2023 Banerjee ............... H04L 67/141
                                                                                 709/226

OTHER PUBLICATIONS

Juniper Networks, Inc., "Understanding and Using Trusted DHCP Servers," https://www.juniper.net/documentation/us/en/software/junos/security-services/topics/topic-map/port-security-trusted-dhcp-server.html, Feb. 18, 2021, 6 pages.

R. Droms, "Dynamic Host Configuration Protocol," https://datatracker.ietf.org/doc/html/rfc2131, Network Working Group, Request for Comments: 2131, Mar. 1997, 45 pages.

Wikipedia, "Dynamic Host Configuration Protocol," https://en.wikipedia.org/wiki/Dynamic_Host_Configuration_Protocol, Dec. 29, 2022, 25 pages.

Wikipedia, "Link Layer Discovery Protocol," https://en.wikipedia.org/wiki/Link_Layer_Discovery_Protocol, Jun. 14, 2022, 4 pages.

* cited by examiner

SECURE AND DYNAMIC ASSIGNMENT OF NETWORK ADDRESSES TO NETWORK DEVICES IN AN INFORMATION PROCESSING SYSTEM

FIELD

The field relates generally to information processing systems, and more particularly to assignment of network addresses to network devices in computer networks and other types of information processing systems.

BACKGROUND

In numerous cloud infrastructure deployments, and in a wide variety of other computer network contexts, network management is particularly important. Such network management includes, for example, ensuring that unique Internet Protocol (IP) addresses are assigned to all relevant interfaces of both physical and virtual nodes, in order to facilitate smooth communication between such nodes. Typical conventional approaches to network address assignment in computer networks include utilizing dedicated Dynamic Host Configuration Protocol (DHCP) servers to manage the assignment of IP addresses to all devices in the network. However, such conventional approaches can be problematic under certain conditions. For example, a given DHCP client typically advertises via a DHCP DISCOVER packet in order to find a DHCP server. However, a rogue DHCP server or other malicious server can offer the DHCP client an invalid IP address that will not be properly routed, which can be used to create a Denial-of-Service (DOS) attack against the client and/or to allow the malicious server to scan, capture or otherwise control the network traffic associated with the client. Another conventional approach is for a network administrator to provision static IP addresses for nodes, typically during an on-boarding process for the corresponding devices or as part of a subsequent setup process. However, this approach is unduly tedious, as the network administrator needs to consider extensive details of the network topology and available network interface card (NIC) ports when provisioning the IP addresses. A need therefore exists for improved IP address assignment techniques that can avoid these and other drawbacks of conventional practice.

SUMMARY

Illustrative embodiments provide techniques for secure and dynamic assignment of IP addresses to host network interfaces or other interfaces of physical and virtual nodes or other network devices in a computer network, such as cloud infrastructure, cluster infrastructure or other deployments of information technology (IT) infrastructure. In some embodiments, the disclosed techniques advantageously avoid the above-noted security problems that might otherwise arise when a rogue DHCP server or other malicious server intervenes in the IP address assignment process. Moreover, such techniques advantageously avoid the need for a network administrator to provision static IP addresses for nodes.

Some embodiments disclosed herein provide systems and methods that are agnostic to the particular network topology in the IT infrastructure.

Additionally or alternatively, some embodiments implement a management controller configured to provide automated dynamic assignment of IP addresses based on characteristics such as traffic class and category.

In these and other embodiments, the management controller may be configured to provide secure and dynamic IP address assignment responsive to changes in network configuration or other system characteristics.

In an illustrative embodiment, secure and dynamic assignment of IP addresses is implemented at least in part using a Link Layer Discovery Protocol (LLDP) packet exchange for IP assignment on network ports of one or more nodes in cloud infrastructure, cluster infrastructure or other computer network contexts.

Some embodiments incorporate a baseboard management controller (BMC) and one or more network switches, although it is to be appreciated that additional or alternative components can be used in other embodiments.

In an illustrative embodiment, an apparatus comprises at least one processing device that includes a processor coupled to a memory, with the at least one processing device being configured to implement a management controller for a network device, the management controller being configured to communicate with at least one management server external to the network device. The at least one processing device is further configured to obtain network configuration information for one or more network interfaces of the network device, to deploy a network address server at least in part on the management controller, and to utilize the network address server deployed at least in part on the management controller to assign at least one network address to each of one or more of the network interfaces of the network device.

In some embodiments, the management controller more particularly comprises a BMC, and the network address server more particularly comprises a DHCP server, although it is to be appreciated that additional or alternative management controllers and network address servers can be used in other embodiments.

These and other illustrative embodiments include, without limitation, systems, apparatus, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources, as well as other types of systems comprising a combination of cloud and edge infrastructure. Numerous different types of enterprise computing and storage systems are also encompassed by the term "information processing system" as that term is broadly used herein.

Figure 1:
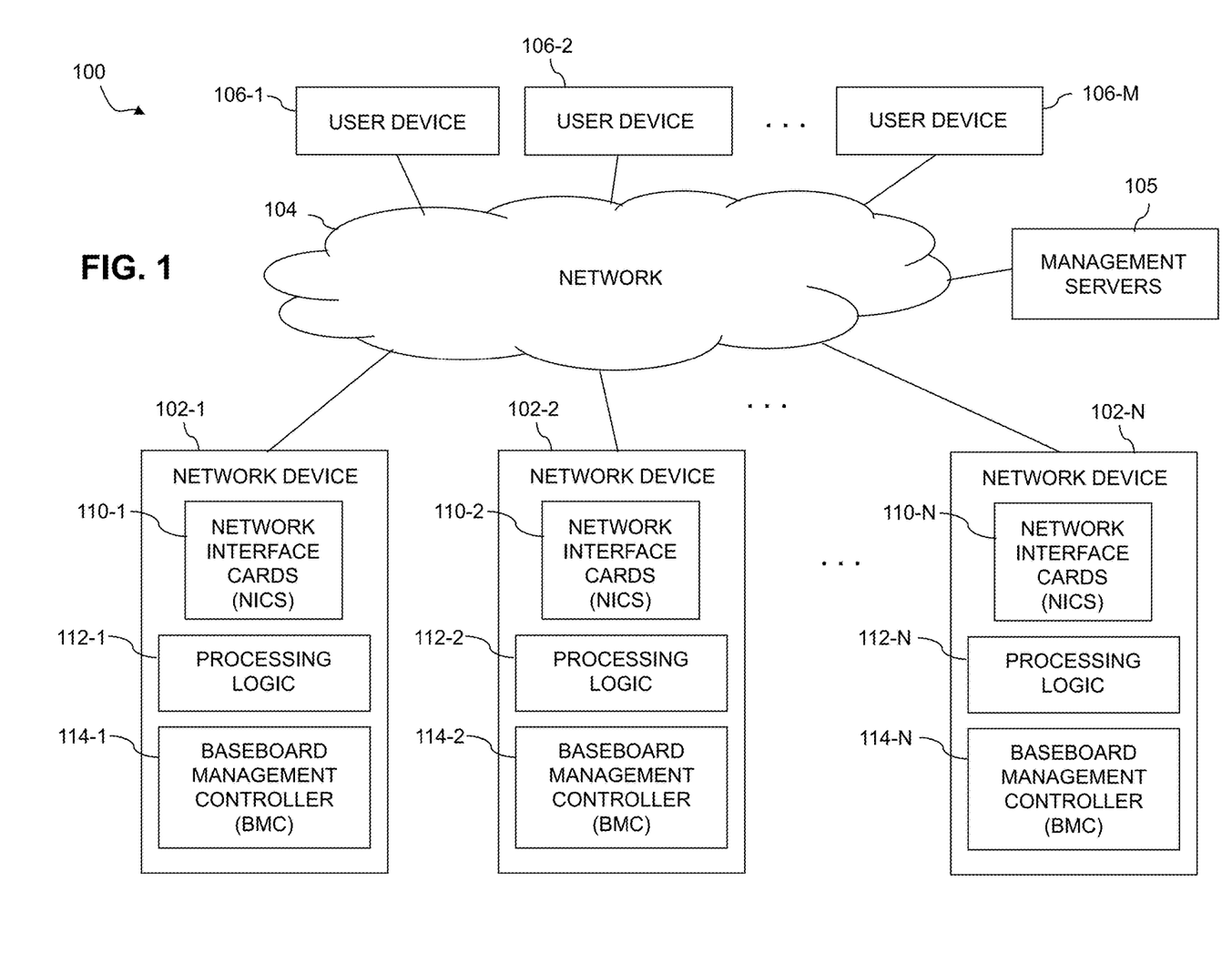
FIG. 1 is a block diagram of an example information processing system implementing secure and dynamic assignment of IP addresses in an illustrative embodiment.

FIG. 1 shows an information processing system 100 configured to implement functionality for secure and dynamic assignment of IP addresses in accordance with an illustrative embodiment. The information processing system 100 as shown comprises a plurality of network devices 102-1, 102-2, ... 102-N, collectively referred to herein as network devices 102. The network devices 102 are coupled to a network 104, and in some embodiments may alternatively be viewed as comprising respective components of the network 104. The system 100 further comprises management servers 105 and a plurality of user devices 106-1, 106-2, ... 106-M, with the user devices being collectively referred to herein as user devices 106. At least portions of the system 100 may be viewed as collectively comprising one or more computer networks.

The network devices 102 illustratively comprise respective sets of network interface cards (NICs) 110-1, 110-2, ... 110-N, respective instances of processing logic 112-1, 112-2, ... 112-N, and respective baseboard management controllers (BMCs) 114-1, 114-2, ... 114-N, collectively referred to as respective NICs 110, processing logic 112 and BMCs 114.

It should be noted that this particular example configuration of system components, such as network devices 102, network 104, management servers 105 and user devices 106, can be varied relative to the arrangement shown in FIG. 1. For example, in other embodiments, different arrangements, possibly including additional or alternative system components, can be used to implement the disclosed functionality for secure and dynamic assignment of IP addresses to network devices.

A given one of the network devices 102 of system 100 may comprise, for example, a computer, a server, a host device, a storage system, or portions or combinations of these or other devices. Such network devices 102 are examples of what are more generally referred to herein as "processing devices." In some embodiments, one or more of the network devices 102 may be implemented at least in part using cloud-based virtualization infrastructure such as a virtual machine or container. Network devices 102 can include, for example, various arrangements of physical nodes and/or virtual nodes. The term "network device" as used herein is therefore intended to be broadly construed, so as to encompass these and other arrangements of one or more processing devices.

The network devices 102 in some embodiments comprise respective computers associated with a particular company, organization or other enterprise. In addition, at least portions of the information processing system 100 may also be referred to herein as collectively comprising an "enterprise network." Numerous other operating scenarios involving a wide variety of different types and arrangements of processing devices and networks are possible, as will be appreciated by those skilled in the art.

A given one of the user devices 106 may comprise, for example, a mobile telephone, a laptop computer, a tablet computer, a desktop computer or another type of processing device from which one or more users can access system resources accessible via, or otherwise associated with, the network devices 102.

The user devices 106 are assumed to be associated with one or more users of the system 100. For example, such users can illustratively access protected resources of the system 100, such as protected resources of one or more of the network devices 102, by initiating a login procedure via one of the user devices 106. The term "user device" as used herein is intended to be broadly construed so as to encompass a wide variety of different types of processing devices or combinations of multiple such devices used to access network devices having IP addresses assigned thereto in the manner disclosed herein. A client system comprising multiple distinct processing devices is therefore considered a type of "client device" as that latter term is broadly used herein.

Also, it is to be appreciated that the term "user" in this context and elsewhere herein is intended to be broadly construed so as to encompass, for example, human, hardware, software or firmware entities, as well as various combinations of such entities.

Although multiple network devices 102, management servers 105 and user devices 106 are shown in the FIG. 1 embodiment, other embodiments can include single instances of such components rather than multiple instances of such components. The variables N and M denoting respective numbers of network devices 102 and user devices 106 are therefore considered arbitrary integer values greater than or equal to one.

The network 104 is assumed to comprise a portion of a global computer network such as the Internet, although other types of networks can be part of the information processing system 100, including a wide area network (WAN), a local area network (LAN), a satellite network, a telephone or cable network, a cellular network such as a 4G or 5G network, a wireless network such as a WiFi, WiMAX, Bluetooth or near field communication (NFC) network, or various portions or combinations of these and other types of networks. The information processing system 100 in some embodiments therefore comprises combinations of multiple different types of networks each comprising processing devices configured to communicate using IP or other related communication protocols. Numerous alternative networking arrangements are possible in a given embodiment, as will be appreciated by those skilled in the art.

The network 104 illustratively comprises a plurality of network switches. These may include, for example, various types of routers, switch fabrics or other types of switching equipment, including in some embodiments management switches for carrying management traffic between the management servers 105 and the network devices 102.

The network devices 102 in some embodiments comprise or are otherwise associated with one or more storage systems. Such storage systems can comprise any of a variety of different types of storage including by way of example network-attached storage (NAS), storage area networks (SANs), direct-attached storage (DAS) and distributed DAS, as well as combinations of these and other storage types, including but not limited to flash storage, storage arrays, software-defined storage, cloud storage and object-based storage.

The network devices 102 can comprise, for example, one or more host devices of a storage system of the type noted above, one or more storage nodes of a distributed storage system, and/or other types of physical or virtual nodes, although numerous other types and arrangements of network devices 102 are possible in a given embodiment.

Although illustratively shown as being arranged internally to the network devices 102 in the illustrative embodiment of FIG. 1, the BMCs 114 in some embodiments can be arranged at least in part externally to their respective corresponding network devices 102. For example, a given one of the BMCs 114 can be implemented at least in part on a separate processing device coupled to its corresponding one of the network devices 102.

As indicated above, conventional approaches to IP address assignment can be problematic under certain conditions. For example, a given DHCP client typically advertises via a DHCP DISCOVER packet in order to find a DHCP server. However, a rogue DHCP server or other malicious server can offer the DHCP client an invalid IP address that will not be properly routed, which can be used to create a DOS attack against the client and/or to allow the malicious server to scan, capture or otherwise control the network traffic associated with the client. Another conventional approach is for a network administrator to provision static IP addresses for nodes, typically during an on-boarding process for the corresponding devices or as part of a subsequent setup process. However, this approach is unduly tedious, as the network administrator needs to consider extensive details of the network topology and available NIC ports when provisioning the IP addresses.

Illustrative embodiments disclosed herein provide techniques for secure and dynamic IP address assignment that avoid the above-noted drawbacks of conventional approaches. For example, some embodiments advantageously provide techniques for secure and dynamic assignment of IP addresses to host network interfaces or other interfaces of physical and virtual nodes or other network devices in a computer network, such as cloud infrastructure, cluster infrastructure or other deployments of IT infrastructure. In some embodiments, the disclosed techniques advantageously avoid the above-noted security problems that might otherwise arise when a rogue DHCP server or other malicious server intervenes in the IP address assignment process. Moreover, such techniques advantageously avoid the need for a network administrator to provision static IP addresses for nodes.

In the FIG. 1 embodiment, the secure and dynamic IP address assignment techniques are illustratively implemented at least in part using the NICs 110, processing logic 112 and BMCs 114 of the respective network devices 102.

Figure 4:
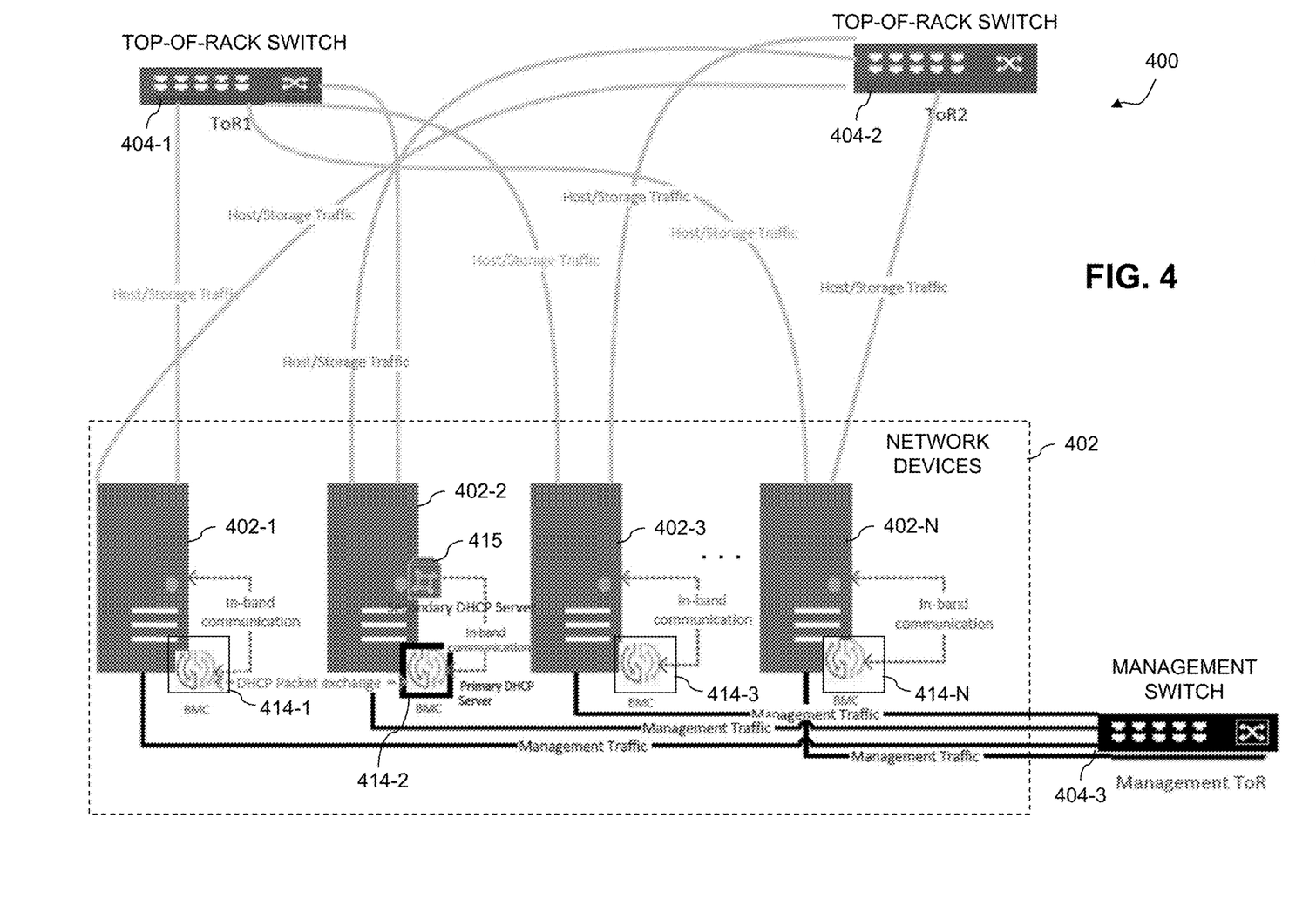
FIG. 4 is a block diagram of another example information processing system implementing secure and dynamic assignment of IP addresses in an illustrative embodiment.

For example, a given one of the network devices 102, illustratively the first network device 102-1, is configured to implement a corresponding BMC 114-1. The BMC 114-1 is configured to communicate with at least one of the management servers 105. The management servers 105 are illustratively implemented as external servers relative to the network devices 102, and interact with their respective BMCs 114 to provide external management functionality for the network devices 102. In some embodiments, the management servers 105 communicate with the network devices 102 via one or more management switches of the network 104, such as one or more Top-of-Rack (ToR) management switches, an example of which is shown in FIG. 4. Such management switches of the network 104 illustratively convey management traffic between the management servers 105 and the network devices 102.

The network device 102-1 is further configured to obtain network configuration information for one or more network interfaces of the network device 102-1, such as one or more of the NICs 110-1, which may illustratively include one or more physical NICs, one or more virtual NICs, or combinations of physical and virtual NICs. The network interfaces of the network device 102-1 are not limited to the NICs 110-1, and may therefore include additional or alternative network interfaces of various types, as would be appreciated by those skilled in the art. The term "network interface" as used herein is therefore intended to be broadly construed so as to encompass, for example, at least one physical NIC, at least one virtual NIC, or one or more network ports thereof.

The network device 102-1 is still further configured to deploy a network address server at least in part on the BMC 114-1, and to utilize the network address server deployed at least in part on the BMC 114-1 to assign at least one network address to each of one or more of the network interfaces of the network device 102-1.

In some embodiments, the network address server deployed at least in part on the BMC 114-1 more particularly comprises at least one DHCP server, although other types and arrangements of additional or alternative network address servers may be used.

Conventional aspects of DHCP are described in more detail in, for example, Internet Engineering Task Force (IETF) Request for Comments (RFC) 2131, Dynamic Host Configuration Protocol, March 1997, which is incorporated by reference herein in its entirety.

As indicated previously, the network device 102-1 is an example of what is more generally referred to herein as a "processing device." Other arrangements of at least one processing device can be configured to implement the secure and dynamic IP address assignment functionality disclosed herein.

The BMC 114-1 is an example of what is more generally referred to herein as a "management controller" of the network device 102-1. Other types and arrangements of management controllers can be used in other embodiments.

In some embodiments, the network address server deployed at least in part on the BMC 114-1 of the network device 102-1 comprises a primary network address server of the network device 102-1 and the network device 102-1 is further configured to implement a secondary network address server configured for communication with the primary network address server. An example of an arrangement of this type is shown in FIG. 4.

The BMCs 114 of the respective network devices 102 are illustratively configured to communicate with one another. For example, the BMC 114-1 of the first network device 102-1 is illustratively configured to communicate with the BMC 114-2 of the second network device 102-2, and similar inter-BMC communication arrangements are assumed for each of the other BMCs 114 of the other network devices 102. Accordingly, each of one or more of the BMCs 114 is illustratively configured to communicate with one or more other ones of the BMCs 114, to facilitate secure and dynamic assignment of IP addresses to network interfaces of network devices 102 using the techniques disclosed herein.

In addition, as indicated previously, each of the BMCs 114 is assumed to communicate with at least one of the management servers 105, illustratively via one or more management switches of the network 104.

In some embodiments, the BMC 114-1 of the network device 102-1 is configured to exchange one or more network address assignment information packets with one or more other ones of the BMCs 114 of one or more other ones of the network devices 102, such as with the BMC 114-2 of the network device 102-2.

A given such network address assignment information packet illustratively comprises a Link Layer Discovery Protocol (LLDP) packet, although other types and arrangements of additional or alternative packets can be used to convey network address assignment information between the BMCs 114 of the network devices 102.

Conventional aspects of LLDP packets are described in, for example, IEEE Standard 802.1AB—Station and Media Access Control Connectivity Discovery, April 2005, which is incorporated by reference herein in its entirety. In illustrative embodiments disclosed herein, an LLDP packet payload is modified to incorporate network address assignment information sent by one of the BMCs 114 to another one of the BMCs 114.

A more detailed example of an LLDP packet configured in accordance with aspects of the present disclosure to convey network address assignment information between the BMCs 114 of the network devices 102 will be described below in conjunction with FIG. 3. The term "network address assignment information" as used herein is intended to be broadly construed, and may comprise any of the particular types of information mentioned in conjunction with the FIG. 3 example, as well as additional or alternative information, including information utilized by the network address server in assigning IP addresses.

In some embodiments, the BMC 114-1 of the network device 102-1 is configured to create a mapping of network ports of each of one or more of the NICs 110-1 with corresponding physical MAC addresses and to share at least portions of that mapping with at least one other one of the BMCs 114 of at least one other one of the network devices 102. Such a mapping may be viewed as an example of "network configuration information" as that term is broadly used herein, and may additionally or alternatively comprise network address assignment information that is exchanged via the above-noted LLDP packet.

Additionally or alternatively, the BMC 114-1 in some embodiments is configured to deploy a virtual NIC as part of the NICs 110-1, to utilize the network address server to provision an IP address for the virtual NIC, and to expose the IP address of the virtual NIC to other ones of the network devices 102 via the network address server. The network address server in such an embodiment is further utilized to assign an IP address to each of one or more of the other network devices 102. For example, the network address server can be utilized to assign an IP address to each of one or more physical or virtual NICs of the corresponding NICs 110 of the one or more other network devices 102.

In some embodiments, the network device 102-1, illustratively via its processing logic 112-1 and BMC 114-1, is configured to execute at least a portion of a workflow that comprises a configuration intent determination mode that includes determination of one or more of a network topology and a network address type to be used, a probe mode that is initiated by one or more specified trigger conditions and that includes determination of one or more of virtual network configuration information, switch network configuration information, network card configuration information, and management controller load information, and a setup and configuration mode that performs one or more of creating a virtual network, configuring and selecting one or more DHCP servers, obtaining IP addresses from an address pool and configuring IP addresses for respective network interface cards.

Other types and arrangements of modes or additional or alternative operations may be used in such a workflow in other embodiments. A more particular example of such a workflow will be described below in conjunction with FIG. 5.

The particular example functionality attributed to network device 102-1 in the above description of illustrative embodiments can be similarly implemented in one or more other ones of the network devices 102, utilizing their respective instances of NICs 110, processing logic 112 and BMCs 114.

It is to be appreciated that the particular set of system elements and other components and associated functionality as illustrated in the system 100 of the FIG. 1 embodiment is presented by way of example only, and a wide variety of alternative arrangements can be used in other embodiments. For example, at least portions of the functionality associated with components 110, 112 and 114 in other embodiments can be combined into a single component, or separated across a larger number of components.

It should also be noted that at least portions of the processing logic 112 of network devices 102 are illustratively implemented at least in part in the form of software comprising program code stored in memory and executed by a processor.

An illustrative embodiment of an example process for secure and dynamic IP address assignment in the information processing system 100 will now be described in more detail with reference to the flow diagram of FIG. 2.

The process as illustrated includes steps 200 through 206, which are illustratively performed primarily by at least a subset of the network devices 102 utilizing its corresponding instances of NICs 110, processing logic 112 and BMC 114, although additional or alternative system components may be used in other embodiments. It is also to be understood that this particular process is only an example, and additional or alternative processes can be carried out in other embodiments.

In step 200, BMCs are implemented for respective ones of a plurality of network devices. For example, BMCs 114 are illustratively implemented for respective ones of the network devices 102.

In step 202, network configuration information is obtained for one or more network interfaces of each of one or more of the network devices. For example, network configuration information can be obtained for NICs 110 of network devices 102.

In step 204, at least one network address server is deployed at least in part on the BMC of at least a given one of the network devices. For example, in some embodiments, both a primary DHCP server and a secondary DHCP server are deployed on the BMC of a given one of the network devices 102.

In step 206, the network address server deployed at least in part on the BMC of the given network device is utilized to assign at least one network address to each of one or more of the network interfaces of at least one of the network devices, illustratively the given network device itself and/or another one of the network devices.

Figure 2:
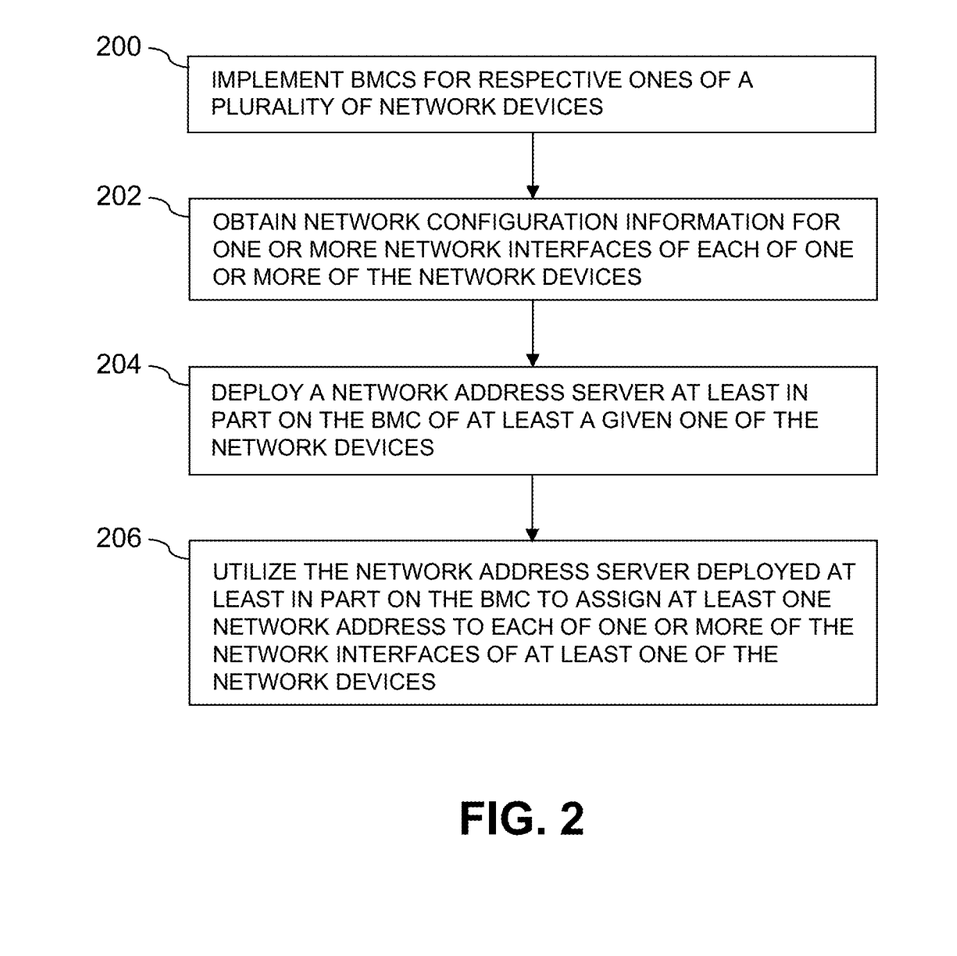
FIG. 2 is a flow diagram of an example process for secure and dynamic assignment of IP addresses in an illustrative embodiment.

The particular processing operations and other system functionality described in conjunction with the flow diagram of FIG. 2 are presented by way of illustrative example only, and should not be construed as limiting the scope of the present disclosure in any way. Alternative embodiments can use other types of processing operations to implement secure and dynamic IP address assignment as disclosed herein. For example, certain steps may be performed at least in part concurrently with one another rather than serially. As additional examples, at least portions of the process steps may be repeated periodically for different IP address assignment instances, and multiple such instances can be performed in parallel with one another to implement IP address assignment for multiple network devices.

Also, functionality such as that described in conjunction with the flow diagram of FIG. 2 can be implemented at least in part in the form of one or more software programs stored in program code of at least one memory and executed by at least one processor in one or more processing devices implementing a secure and dynamic IP address assignment process as disclosed herein. A storage device or other memory having executable program code of one or more software programs embodied therein is an example of what is more generally referred to herein as a "processor-readable storage medium."

The foregoing example process is therefore illustrative only, and should not be viewed as limiting the scope of any particular embodiment in any way. Those skilled in the art will appreciate that numerous alternative arrangements for secure and dynamic IP address assignment can be used in other embodiments.

Additional illustrative embodiments of secure and dynamic IP address assignment arrangements will now be described with reference to FIGS. 3, 4 and 5. A given network device in these and other embodiments herein illustratively comprises one or more nodes, such as one or more physical nodes, one or more virtual nodes, and/or a combination of at least one physical node and at least one virtual node. The term "network device" as used herein can therefore encompass one or more nodes of various types.

In some of the embodiments to be described, a BMC is illustratively configured to obtain network port information for each of a plurality of nodes or other network devices. For example, the BMC in some embodiments collects NIC inventory information for a given node or other network device as part of a boot process, and creates a mapping for all the network ports with corresponding physical MAC addresses. The mapping is added to the LLDP packet that will be shared with one or more neighboring network devices as part of a packet exchange. The BMC is additionally or alternatively configured to create a virtual NIC, which will be used for in-band communication with the BMC, illustratively via dynamic plug-and-play (PnP) buses such as USB and Bluetooth. The BMC in some embodiments will assign specific MAC address and identity information for the virtual NIC. For provisioning of IP addresses, the BMC is illustratively configured to create a dynamic DHCP server on the BMC and to use that DHCP server to expose the IP address for the virtual NIC. The same DHCP server is additionally used in some embodiments for provisioning of IP addresses for other devices in the computer network infrastructure.

Additionally or alternatively, at least one network switch in some embodiments has the MAC addresses for all the connected nodes that will be collected as part of network packet transmission. Also, the network switch collects one or more LLDP packets that are sent by each of one or more connected servers. This information is illustratively stored in an internal memory of the network switch that is synchronized with all the connected nodes.

Figure 3:
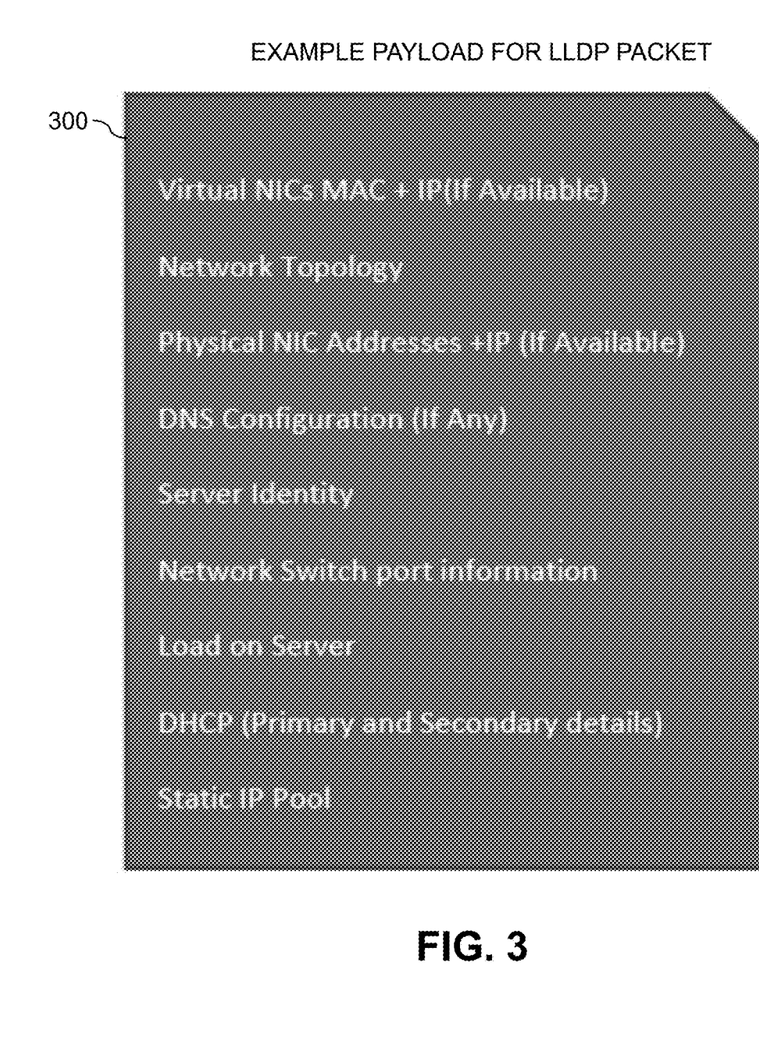
FIG. 3 shows an example LLDP packet payload comprising information utilized in secure and dynamic assignment of IP addresses in an illustrative embodiment.

Referring now to FIG. 3, an example payload 300 for an LLDP packet conveyed from one BMC of one network device to another BMC of another network device is shown. For example, the example payload 300 is illustratively included in one or more LLDP packets sent from BMC 114-1 to BMC 114-2 in system 100, or vice versa. The example payload 300 may be sent in a single LLDP packet or distributed across multiple LLDP packets.

In this embodiment, the example payload 300 illustratively comprises at least a portion of the following information: virtual NIC media access control (MAC) addresses and IP addresses (if available), network topology, physical NIC MAC addresses and IP addresses (if available), Domain Name System (DNS) configuration (if any), server identity information, network switch port information, load on server information, DHCP information (primary and secondary details), and/or static IP pool information.

Additional or alternative information can be included in the LLDP packet payload in other embodiments. Also, illustrative embodiments are not limited to use with LLDP packets, but can utilize other types of packets in other communication protocols.

FIG. 4 shows an information processing system 400 comprising a set of network devices 402-1, 402-2, 402-3, . . . 402-N, collectively referred to as network devices 402, in another illustrative embodiment. The system 400 implements secure and dynamic assignment of IP addresses utilizing BMCs 414-1, 414-2, 414-3, . . . 414-N, collectively referred to as BMCs 414, implemented at least in part within their respective corresponding ones of the network devices 402. Each of the BMCs 414 illustratively communicates with one or more other components of its corresponding network device via in-band communication as indicated.

The system 400 as shown further comprises a network comprising a plurality of network switches, illustratively including at least first and second ToR switches 404-1 and 404-2, also denoted as ToR1 and ToR2, respectively, and a management switch 404-3, also denoted as a management ToR switch. Each of the first and second ToR switches 404-1 and 404-2 illustratively carries host and/or storage traffic to or from the network devices 402 as shown. The management switch 404-3 illustratively carries management traffic to and from the BMCs 414 of the network devices 402. A wide variety of additional or alternative arrangements of switches can be used in the network of system 400.

In the FIG. 4 embodiment, a particular one of the network devices 402, illustratively the network device 402-2, implements on its BMC 414-2 a primary DHCP server. The primary DHCP server is configured to communicate using in-band communication with a secondary DHCP server 415 implemented on the network device 402-2. The primary DHCP server also communicates via DHCP packet exchange with the BMC 414-1 of network device 402-1, as illustrated in the figure, and may similarly communicate with other ones of the BMCs 414 on other ones of the network devices 402.

Figure 5:
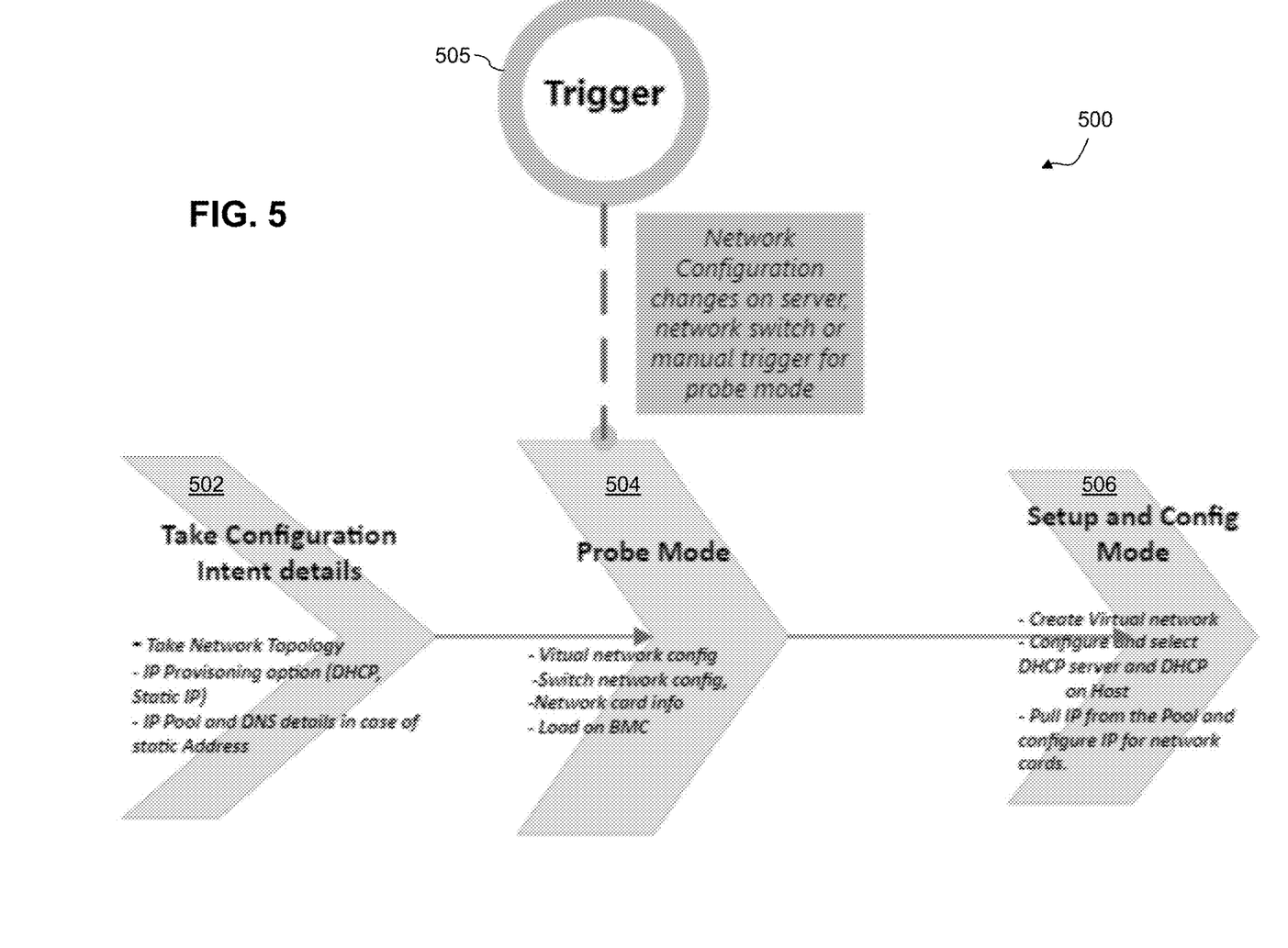
FIG. 5 shows an example multi-mode workflow for secure and dynamic assignment of IP addresses in an illustrative embodiment.

Referring now to FIG. 5, an example workflow 500 executed at least in part by a network device in illustrative embodiments, such as a given one of the network devices 102 in system 100 or a given one of the network devices 402 in system 400, includes a plurality of phases or modes. These modes are illustratively denoted in the figure as a take configuration intent details mode 502, a probe mode 504, which is potentially initiated responsive to at least one trigger 505, and a setup and configuration mode 506. The modes 502, 504 and 506 of the example workflow 500 are each described in further detail below.

1. Configuration Intent Determination Mode

The intent configuration in some embodiments is done at the node level, illustratively using a graphical user interface (GUI) of the BMC and/or using an application program interface (API) of the BMC, such as a redfish API. The intent illustratively comprises one or more of the following types of intent:
  (a) Network Topology and Configuration Intent. This configuration will be used for cluster node(s) configuration for virtual attributes. This will be used for the creation of virtual network adaptors in case it is needed.
  (b) IP Address Configuration Intent. A user will indicate or otherwise designate an intent for DHCP address or static IP address for each node and address. In the case of static IP address, the user may designate IP addresses, such as IP addresses for each card, whether virtual or physical, including IPv4 as well as IPv6 addresses.

2. Probe Mode

The network switch and BMC will be triggered into probe mode responsive to any connectivity changes on a server or on a ToR switch. The probe mode can be triggered in one or more of the following ways:
  (a) If there are any configuration changes on server (e.g., network card related changes or operating system (OS) virtual network related changes) the BMC will trigger probe mode.
  (b) If there is any new node addition, the network switch will trigger probe mode.
  (c) Probe mode can also be triggered manually using a network switch management interface or a BMC interface (e.g., an API call or using a web interface).

Once the server is in probe mode the BMC will consolidate information using inventory information, illustratively including at least a subset of the following, although additional or alternative information can be used:
  (a) Virtual network configuration information is pulled from a software stack using an existing in-band channel, and includes, for example, virtual network card details and cluster information (if available).
  (b) Switch network configuration information is obtained for all the ports and connectivity to the network cards.
  (c) Network card configuration information is obtained for all the network cards, including network MAC address for each network card, network card capability (e.g., RDMA capable or not), and mapping with switch port.
  (d) Load on BMC information including processes running on BMC.

The BMC will consolidate and refine this information in an appropriate repository implementing using memory or other storage device.

3. Setup and Configuration Mode

Based on the configuration intent the BMC will communicate with the OS to create virtual network cards and the required topology.

Also, based on load and intent the BMC will configure the DHCP server, and this DHCP server will be available on all the BMC instances of the one or more server nodes, but only one DHCP server will be in an active node. The active node will push an agent (e.g., using an in-band mechanism) to the host and that will act as a secondary for the DHCP server. Both the primary (e.g., the DHCP server present on the BMC of the node) and the secondary (e.g., the DHCP server present on the host of the node) DHCP server will be used for discovery of nodes, and in some embodiments will exchange packets once a DHCP DISCOVER packet is received from another client node. All the client BMC instances will also communicate with the host using existing channels (e.g., IPMI, USB passthrough, etc.)

If the intent is for static IP, the IP addresses will be picked based on the category. For example, IP addresses for management will be assigned to management NICs and storage IP addresses will be assigned to storage NICs.

An example secure DHCP workflow in illustrative embodiments proceeds in the manner described below.

The DHCP server provisioned on the BMC will send a DHCP OFFER packet to each of one or more nodes, using the host (secondary) agent. It will be sent to the requesting node which is requesting an IP address using a DHCP DISCOVER packet. Here, the DHCP DISCOVER packet will have a signature of host and the DHCP DISCOVER packet will be encrypted using a vendor private key available in the BMC. On receiving the DHCP DISCOVER packet, the DHCP server will decrypt the packet using a vendor private key available in the BMC. Then it will send a DHCP OFFER message, which is also encrypted using the vendor private key.

Similarly, all further packets will be exchanged between the DHCP client and the DHCP server in an encrypted format. Some embodiments of this type assume that the nodes are of the same vendor type. The secondary DHCP server agent will communicate with the BMC for encryption and decryption of packets that will be exchanged between server and client for the discovery process.

Some embodiments include tagging of the switch port to which the DHCP server will be attached. For example, after allocation of the DHCP server the identity of the DHCP server will be shared with the attached switch and that will be redirected to another connected ToR switch. This information is illustratively shared with a new server on connection to the ToR switch, that way the new server will be able to directly communicate with the DHCP server.

For static IP addresses, the IP addresses will be picked from the pool during a configuration process, and will be allocated using each server BMC sequentially. In such an arrangement, the BMC will allocate the IP addresses for all the NIC cards and then share the IP addresses with other BMC instances as part of the above-described probe mode. The BMC instances of all the nodes will pick a coordinator node based on load (e.g., the BMC which is having least load will be picked as leader) and that BMC will propagate the IP addresses.

The above-described processes and other features and functionality disclosed herein are presented by way of illustrative example only, and other embodiments can utilize additional or alternative arrangements.

As indicated previously, illustrative embodiments provide a number of significant advantages relative to conventional arrangements.

For example, some embodiments provide techniques for secure and dynamic assignment of IP addresses.

Such techniques can be advantageously deployed in a wide variety of different computer networks or other information processing system arrangements, such as cloud infrastructure, cluster infrastructure or other deployments of IT infrastructure.

Some embodiments disclosed herein provide systems and methods that are agnostic to the particular network topology in the IT infrastructure.

Additionally or alternatively, some embodiments implement a BMC or other type of management controller configured to provide automated dynamic assignment of IP addresses based on characteristics such as traffic class and category.

In these and other embodiments, the BMC or other management controller may be configured to provide secure and dynamic IP address assignment responsive to changes in network configuration or other system characteristics.

In some embodiments, the disclosed techniques advantageously avoid the above-noted security problems that might otherwise arise when a rogue DHCP server or other malicious server intervenes in the IP address assignment process.

Moreover, such techniques advantageously avoid the need for a network administrator to provision static IP addresses for nodes.

Illustrative embodiments provide unique systems, methods, apparatus and computer program products that are agnostic to the network topology in the computer network infrastructure. Additionally or alternatively, some embodiments provide solutions that include a BMC or other processing device configured to provide automated dynamic assignment of IP addresses based on the traffic class and category, and/or that implement secure IP address assignment with detection of changes in network configuration.

Some embodiments can be used for an edge category of devices where a BMC implemented on an edge device and a corresponding smart NIC are utilized to orchestrate the assignment of the network configuration.

Additionally or alternatively, illustrative embodiments can be used to directly provision IP addresses in a hyperconverged infrastructure (HCI) cluster or other type of cloud infrastructure, including a "dark site" scenario.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement processing devices with secure and dynamic IP address assignment functionality will now be described in greater detail with reference to FIGS. 6 and 7. Although described in the context of system 100, these platforms may also be used to implement at least portions of other information processing systems in other embodiments.

Figure 6:
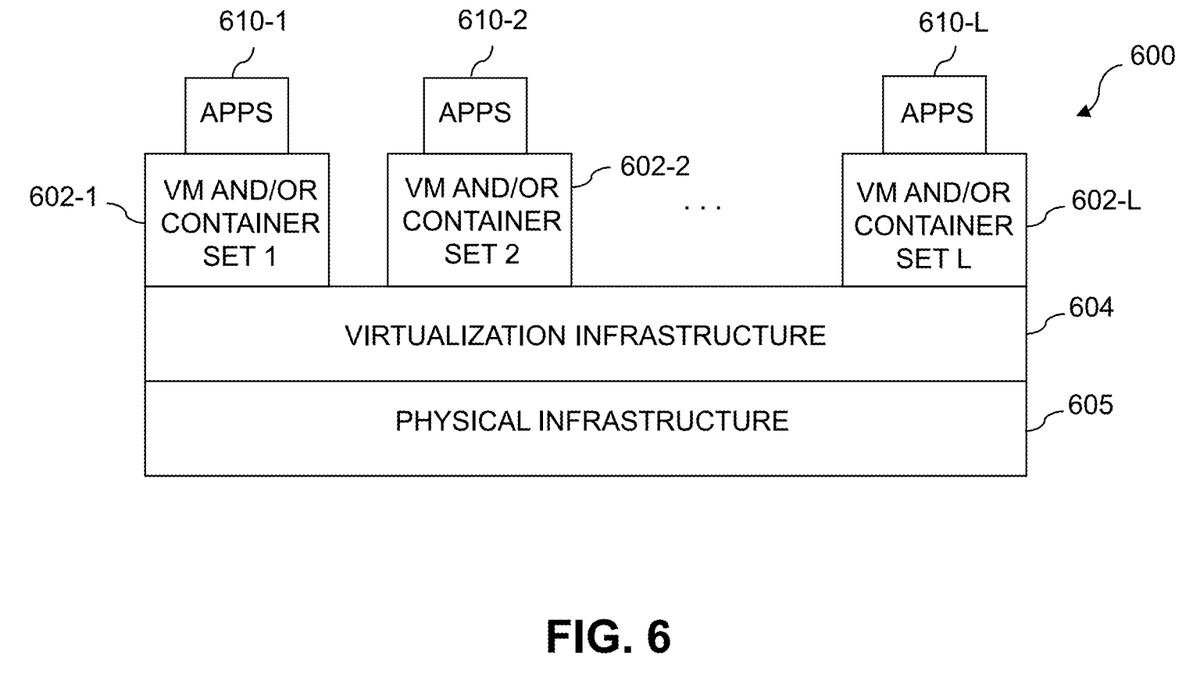
FIGS. 6 and 7 show examples of processing platforms that may be utilized to implement at least a portion of an information processing system in illustrative embodiments.
Figure 7:
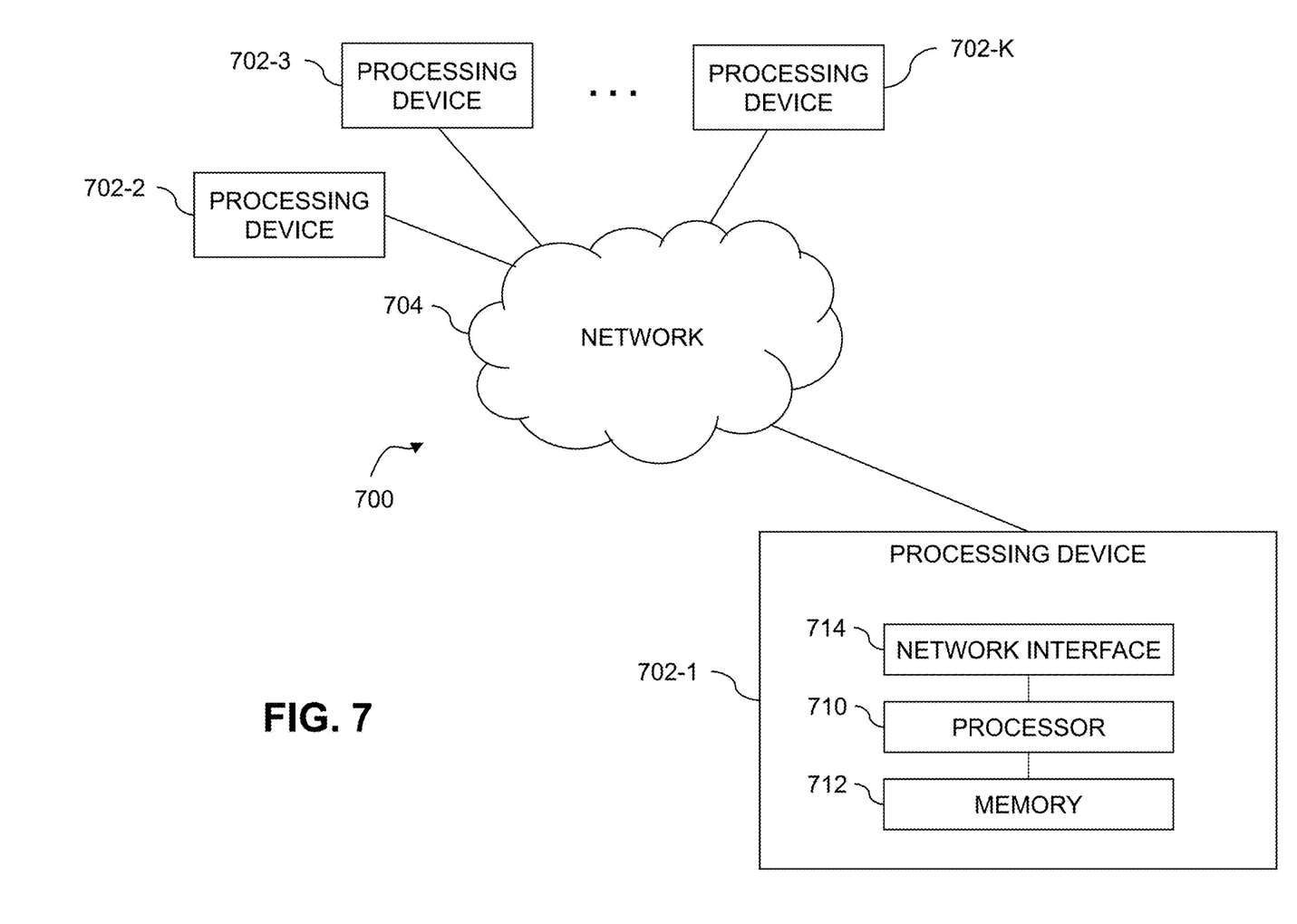

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide at least portions of the disclosed secure and dynamic IP address assignment functionality in an information processing system of the type described above using one or more processes running on a given one of the VMs. For example, each of the VMs can implement logic instances and/or other components providing secure and dynamic IP address assignment functionality in the system 100.

A hypervisor platform may be used to implement a hypervisor within the virtualization infrastructure 604. Such a hypervisor platform may comprise an associated virtual infrastructure management system. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can also provide at least portions of the disclosed secure and dynamic IP address assignment functionality in an information processing system of the type described above. For example, a container host device supporting multiple containers of one or more container sets can implement logic instances and/or other components providing secure and dynamic IP address assignment functionality in the system 100.

As is apparent from the above, one or more of the processing devices or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA), graphics processing unit (GPU) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise various arrangements of converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the secure and dynamic IP address assignment functionality provided by one or more components of an information processing system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, networks, network devices, servers, controllers and additional or alternative components. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
    at least one processing device comprising a processor coupled to a memory;
    wherein the at least one processing device is configured:
    to implement a management controller for a network device, the management controller being configured to communicate with at least one management server external to the network device;
    to obtain network configuration information for one or more network interfaces of the network device;
    to deploy a network address server at least in part on the management controller, the network address server being part of the network device that includes the management controller and separate from the management server, the network address server further being at least partially implemented within the management controller of the network device and being configured to assign network addresses at least in part responsive to respective network address assignment requests received by the network address server; and
    to utilize the network address server deployed at least in part on the management controller to assign at least one network address to each of one or more of the network interfaces of the network device;
    wherein the network address server deployed at least in part on the management controller of the network device comprises a primary network address server of the network device and the network device is further configured to implement a secondary network address server configured for communication with the primary network address server.

2. The apparatus of claim 1 wherein the network device is a first network device of a plurality of network devices that further includes at least a second network device, the management controller of the first network device being a first management controller, the first management controller being configured to communicate with a second management controller of the second network device.

3. The apparatus of claim 2 wherein the first management controller of the first network device is configured to exchange one or more network address assignment information packets with the second management controller of the second network device.

4. The apparatus of claim 3 wherein a given one of the network address assignment information packets comprises a Link Layer Discovery Protocol (LLDP) packet.

5. The apparatus of claim 3 wherein a payload of at least one of the one or more network address assignment information packets comprises at least a portion of one or more of the following:
    virtual network interface card media access control (MAC) addresses and Internet Protocol (IP) addresses;
    physical network interface card MAC addresses and IP addresses;
    network topology information;
    Domain Name System (DNS) configuration;
    server identity information;
    network switch port information;
    server load information;
    DHCP server information; and
    static IP pool information.

6. The apparatus of claim 2 wherein the second management controller is configured to communicate with the at least one management server, the at least one management server being external to both the first and second network devices.

7. The apparatus of claim 1 wherein the at least one processing device comprises at least a portion of the network device.

8. The apparatus of claim 1 wherein the management controller comprises a baseboard management controller (BMC) of the network device.

9. The apparatus of claim 1 wherein the network address server comprises a Dynamic Host Configuration Protocol (DHCP) server.

10. The apparatus of claim 1 wherein the network interfaces comprise respective network ports of one or more network interface cards of the network device.

11. The apparatus of claim 1 wherein the management controller is configured to create a mapping of network ports with corresponding physical MAC addresses and to share at least portions of that mapping with at least one additional management controller of at least one additional network device.

12. The apparatus of claim 1 wherein the management controller is configured:
to deploy a virtual network interface card;
to utilize the network address server to provision an IP address for the virtual network interface card; and
to expose the IP address of the virtual network interface card to other network devices via the network address server;
wherein the network address server is further utilized to assign an IP address to each of one or more of the other network devices.

13. The apparatus of claim 1 wherein the management controller is configured to execute at least a portion of a workflow that comprises:
a configuration intent determination mode that includes determination of one or more of a network topology and a network address type to be used;
a probe mode that is initiated by one or more specified trigger conditions and that includes determination of one or more of virtual network configuration information, switch network configuration information, network card configuration information, and management controller load information; and
a setup and configuration mode that performs one or more of creating a virtual network, configuring and selecting one or more DHCP servers, obtaining IP addresses from an address pool and configuring IP addresses for respective network interface cards.

14. A computer program product comprising a non-transitory processor-readable storage medium having stored therein program code of one or more software programs, wherein the program code when executed by at least one processing device causes the at least one processing device:
to implement a management controller for a network device, the management controller being configured to communicate with at least one management server external to the network device;
to obtain network configuration information for one or more network interfaces of the network device;
to deploy a network address server at least in part on the management controller, the network address server being part of the network device that includes the management controller and separate from the management server, the network address server further being at least partially implemented within the management controller of the network device and being configured to assign network addresses at least in part responsive to respective network address assignment requests received by the network address server; and
to utilize the network address server deployed at least in part on the management controller to assign at least one network address to each of one or more of the network interfaces of the network device;
wherein the network address server deployed at least in part on the management controller of the network device comprises a primary network address server of the network device and the network device is further configured to implement a secondary network address server configured for communication with the primary network address server.

15. The computer program product of claim 14 wherein the network device is a first network device of a plurality of network devices that further includes at least a second network device, the management controller of the first network device being a first management controller, the first management controller being configured to communicate with a second management controller of the second network device, and further wherein the first management controller of the first network device is configured to exchange one or more network address assignment information packets with the second management controller of the second network device.

16. A method comprising:
implementing a management controller for a network device, the management controller being configured to communicate with at least one management server external to the network device;
obtaining network configuration information for one or more network interfaces of the network device;
deploying a network address server at least in part on the management controller, the network address server being part of the network device that includes the management controller and separate from the management server, the network address server further being at least partially implemented within the management controller of the network device and being configured to assign network addresses at least in part responsive to respective network address assignment requests received by the network address server; and
utilizing the network address server deployed at least in part on the management controller to assign at least one network address to each of one or more of the network interfaces of the network device;
wherein the network address server deployed at least in part on the management controller of the network device comprises a primary network address server of the network device and the network device is further configured to implement a secondary network address server configured for communication with the primary network address server; and
wherein the method is performed by at least one processing device comprising a processor coupled to a memory.

17. The method of claim 16 wherein the network device is a first network device of a plurality of network devices that further includes at least a second network device, the management controller of the first network device being a first management controller, the first management controller being configured to communicate with a second management controller of the second network device, and further wherein the first management controller of the first network device is configured to exchange one or more network address assignment information packets with the second management controller of the second network device.

* * * * *